Patented Dec. 24, 1940

2,225,920

UNITED STATES PATENT OFFICE 2,225,920

COATING COMPOSITION

George D. Martin, Nitro, W. Va., assignor to Monsanto Chemical Company, St. Louis, Mo., a corporation of Delaware No Drawing. Application July 22, 1937, Serial No. 155,145

16 Claims. (Cl. 134—39)

The present invention relates to improvements in coating compositions and the process of preparing the same. More particularly, the present invention relates to improvements in coating compositions containing a drying oil, such as paints, varnishes, enamels, linoleums and the like.

Many types of paints, varnishes and enamels containing drying oils exhibit the objectionable property of developing tough rubber-like films across their upper surfaces when allowed to stand for a relatively short time in open containers. Such films are usually called "skins" and the process of developing this "skin" formation is called "skinning." In paints or enamels containing certain types of pigments, as well as in mixtures containing relatively large proportions of China-wood oil or polymerized linseed oil, this tendency to skin is greatly increased with the result that skins may form on the surface of the mixture even in their unopened containers. This tendency to develop skin formation is particularly undesirable in dipping operations, where the coating composition in the cointainer is required to be exposed to the air for considerable periods of time while the articles to be coated by the paint, varnish, enamel and the like are immersed therein. Furthermore, in the manufacture of paints, varnishes or enamels and the like or materials comprising the same, it is usually customary to incorporate therein a small proportion of a positive oxidation catalyst to diminish the time of drying of the oil so that the composition will dry within a reasonable time after it is spread in a thin film. This positive oxidation catalyst is commonly called a dryer or siccative. These dryers or siccatives induce varying forms of oxidation phenomena some of which are highly advantageous and necessary and others which are undesirable and objectionable. Thus, while the dryer or siccative aids in the drying of the film of the coating composition containing the drying oil, it also increases the tendency of the composition to film or skin in the container, and further may catalyze the oxidation process too far during the drying of the coating composition when in the film form.

One object of this invention is to provide a drying oil composition possessing improved properties.

A further object of this invention is to provide a drying oil composition possessing improved resistance to skinning when in the container or in bulk condition.

Another object of this invention is to provide a coating composition, comprising a drying oil, and possessing improved properties.

A further object of this invention is to provide a class of materials, which, when incorporated in a drying oil composition, substantially prevents undesirable oxidation of the composition without materially affecting the normal drying rate thereof when flowed or spread on surfaces in a thin film. Other objects will be hereinafter shown.

According to the present invention the undesirable properties of the so-called dryers and the tendency of drying oil compositions, for example paints, varnishes and the like, to develop skins and undesirable oxidation products have been substantially eliminated by the incorporation therein of a small proportion of an aralkylated polyhydric phenol. Preferably the preferred compounds of the present invention comprise benzylated polyhydric phenols.

As one method of operating the present invention, portions of a paint, varnish or enamel, which readily skins on contact with the air, were placed in suitable containers, a small proportion of one of the aralkylated polyhydric phenols incorporated therein and observations made at regular intervals as to the skinning of the composition.

As a specific embodiment of the present invention 20 grams of a quick drying enamel comprising a 25 gallon China-wood oil varnish containing 2.5% of a mixed lead manganese and cobalt dryer was placed in a wide mouth open container of 50 c.c. capacity. 20 milligrams of mono benzyl catechol was incorporated therein and a comparison made as to the skinning time of the same enamel containing no inhibitor of skin formation, a temperature of 25° C. being maintained throughout the tests. It was noted that, while the enamel which did not contain an inhibitor of skin formation developed a thick skin in one day, even with the small amount of the preferred class of inhibitor, for example mono benzyl catechol, a skin was not formed in 32 days.

The example given above is merely illustrative of and is a specific embodiment of the present invention. Among other aralkyl polyhydric phenols which have been employed in a quick drying enamel as described above are dibenzyl catechol, dibenzyl pyrogallol and benzyl hydroquinone. These compounds were found on testing in the manner described above to markedly prevent the formation of skin on the surface of the enamel.

By the term polyhydric phenols as appearing in this specification and claims is meant polyhydroxyl substituted compounds containing a single benzene nucleus.

It is well-known that the use of polyhydric phenols has the decided disadvantage in that enamels, paints, varnishes and the like wherein they are incorporated in sufficient quantity to prevent skinning discolor readily. The compounds of this invention do not readily discolor enamels, paints, varnishes and the like wherein they are incorporated in sufficient quantity to substantially prevent skinning, and further when employed in such quantities substantially do not affect the normal drying time of the coating compositions after they have been flowed or painted on surfaces. Thus, it is readily apparent that a remarkable improvement has been made over the use of phenolic compounds, as for example hydroquinone, catechol, pyrogallol and the like in coating compositions.

The preferred compounds of the present invention are soluble in drying oils and their use therein is, therefore, markedly superior to the use of the polyhydric phenols themselves, which are substantially insoluble in drying oils. A further improvement in the use of the preferred class of compounds lies in their relative insolubility in water, whereas polyhydric phenols, as for example catechol, hydroquinone and resorcinol are readily soluble in water. In paints, and in particular in paints comprising drying oils which are exposed to weathering in the film form, it is highly undesirable that a water-soluble product be incorporated therein. It is well-known to those skilled in the art of paint manufacture that the use of such water soluble products in drying oil paint compositions tends to produce pin holes and pitting in the paint film after exposure to the weather. A further advantage in the use of the preferred class of materials over the use of the polyhydric phenols themselves lies in their increased solubility in typical paint solvents or thinners, which greatly facilitates and enhances their usefulness in paints, varnishes and the like manufacture.

While the amount of preferred class of materials employed in the specific embodiments of the invention as set forth above is 0.1% based on the weight of the total drying oil composition, the quantities employed may be varied depending on the specific composition of the coating material. Generally it is found that less than 1% of the preferred material will be sufficient. Ordinarily 0.05 to 0.50% is sufficient. It is obvious that the processes and compositions described herein may be varied widely in their details without departing from the spirit or scope of the present invention. The present invention is limited solely by the appended claims.

What is claimed is:

1. A coating composition characterized by resistance to skin formation in the bulk condition containing a vegetable drying oil having incorporated therein a positive oxidation catalyst and a controller of oxidation thereof comprising an aralkylated polyhydric phenol.

2. A coating composition characterized by resistance to skin formation in the bulk condition containing a vegetable drying oil having incorporated therein a positive oxidation catalyst and a controller of oxidation thereof comprising a benzylated polyhydric phenol.

3. A coating composition characterized by resistance to skin formation in the bulk condition containing a vegetable drying oil having incorporated therein a positive oxidation catalyst and a controller of oxidation thereof comprising an aralkylated dihydric phenol.

4. A coating composition characterized by resistance to skin formation in the bulk condition containing a vegetable drying oil having incorporated therein a positive oxidation catalyst and a controller of oxidation thereof comprising a benzylated dihydric phenol.

5. A coating composition characterized by resistance to skin formation in the bulk condition containing a vegetable drying oil having incorporated therein a positive oxidation catalyst and a controller of oxidation thereof comprising mono benzyl catechol.

6. A coating composition characterized by resistance to skin formation in the bulk condition containing a vegetable drying oil having incorporated therein a positive oxidation catalyst and a controller of oxidation thereof comprising dibenzyl catechol.

7. A coating composition characterized by resistance to skin formation in the bulk condition containing a vegetable drying oil having incorporated therein a positive oxidation catalyst and a controller of oxidation thereof comprising mono benzyl hydroquinone.

8. The improvement in the manufacture of coating compositions characterized by resistance to skin formation in the bulk condition which comprises mixing the coating composition of the type which rapidly develops skin formation in the bulk condition containing a vegetable drying oil with an aralkylated polyhydric phenol.

9. The improvement in the manufacture of coating compositions characterized by resistance to skin formation in the bulk condition which comprises mixing the coating composition of the type which rapidly develops skin formation in the bulk condition containing a vegetable drying oil with a benzylated polyhydric phenol.

10. The improvement in the manufacture of coating compositions characterized by resistance to skin formation in the bulk condition which comprises mixing the coating composition of the type which rapidly develops skin formation in the bulk condition containing a vegetable drying oil with an aralkylated dihydric phenol.

11. The improvement in the manufacture of coating compositions characterized by resistance to skin formation in the bulk condition which comprises mixing the coating composition of the type which rapidly develops skin formation in the bulk condition containing a vegetable drying oil with a benzylated dihydric phenol.

12. The improvement in the manufacture of coating compositions characterized by resistance to skin formation in the bulk condition which comprises mixing the coating composition of the type which rapidly develops skin formation in the bulk condition containing a vegetable drying oil with mono benzyl catechol.

13. The improvement in the manufacture of coating compositions characterized by resistance to skin formation in the bulk condition which comprises mixing the coating composition of the type which rapidly develops skin formation in the bulk condition containing a vegetable drying oil with dibenzyl catechol.

14. The improvement in the manufacture of coating compositions characterized by resistance to skin formation in the bulk condition which comprises mixing the coating composition of the type which rapidly develops skin formation in the bulk condition containing a vegetable drying oil with mono benzyl hydroquinone.

15. A coating composition containing a drying oil having incorporated therein a positive oxidation catalyst and a controller of oxidation thereof comprising an aralkylated polyhydric phenol.

16. A coating composition containing a drying oil having incorporated therein a positive oxidation catalyst and a controller of oxidation thereof comprising a benzylated dihydric phenol.

GEORGE D. MARTIN.